United States Patent [19]

Vackier et al.

[11] 4,239,366

[45] Dec. 16, 1980

[54] DAYLIGHT UNLOADING SYSTEM FOR MICROFICHE CASETTES

[75] Inventors: Leo N. Vackier, 's-Gravenwezel; Lucien P. Van der Vliet, Hoboken, both of Belgium

[73] Assignee: AGFA-Gevaert N.V., Mortsel, Belgium

[21] Appl. No.: 30,530

[22] Filed: Apr. 16, 1979

[30] Foreign Application Priority Data

Apr. 18, 1978 [GB] United Kingdom ............... 15242/78

[51] Int. Cl.[3] ............................................. G01N 23/04

[52] U.S. Cl. ..................................... 354/310; 250/468

[58] Field of Search ............... 354/277, 307, 310, 311, 354/312, 315, 316; 250/468

[56] References Cited

U.S. PATENT DOCUMENTS

| | | | |
|---|---|---|---|
| 3,286,092 | 11/1966 | Sames | 250/468 |
| 3,652,853 | 3/1972 | Williner et al. | 250/468 |
| 3,777,162 | 12/1973 | Peyser | 250/468 |
| 3,784,834 | 1/1974 | Berger | 250/468 |
| 3,828,195 | 8/1974 | Snarr | 250/468 |
| 3,900,405 | 8/1975 | Bartlette et al. | 250/468 |
| 3,934,735 | 1/1976 | Schmidt | 250/468 |
| 4,156,568 | 5/1979 | Erikson | 354/277 |

FOREIGN PATENT DOCUMENTS

| | | | |
|---|---|---|---|
| 2544818 | 4/1977 | Fed. Rep. of Germany | 354/307 |

*Primary Examiner*—L. T. Hix
*Assistant Examiner*—Alan Mathews
*Attorney, Agent, or Firm*—William J. Daniel

[57] ABSTRACT

A device (40) for unloading microfiche casettes (10) in daylight conditions comprises a housing (41) into which the microfiche cassette (10) is introduced and which is light-tightly closed by means of a door (42). The exit of the housing (41) is coupled with the inlet of a processing apparatus (50) in which the microfiche undergoes its chemical treatment.

The unlocking of the microfiche cassette (10) occurs by disengagement of the locks (19,20) under the influence of tapered portions from the openings (23,24) in the bottom of the microfiche cassette 10 (34,35). Opening of the cassette (10) is carried out by exerting a downwardly directed force upon the rearwardly protruding portion of screen (13). Due to the inclined position of the opened microfiche cassette (10), the microfiche contained in the latter slides towards the entry rollers of the processing apparatus (50).

8 Claims, 4 Drawing Figures

DAYLIGHT UNLOADING SYSTEM FOR MICROFICHE CASETTES

The present invention is concerned with microfiche systems. More particularly, it is concerned with a system by means of which exposed microfiches contained in a cassette may be unloaded from the cassette and fed into a microfiche processor installed in an illuminated room.

In contradistinction to microfilms which are provided on a so-called daylight reel, microfiches are in the form of a sheet film having dimensions approximating those of a post card. A plurality of such sheet films are sold in a common package and in order to transfer one sheet from the package into a microfiche camera, installed in a well lit room, the film has to be put into an appropriate cassette which shields it from ambient light during transfer from the loading station (normally a dark room) to the site where exposures are carried out and vice versa.

In order to dispense with the need for a dark room, which in the microfiche field is only part-time used, systems have been devised for loading and unloading a microfiche cassette under well lit conditions.

Such a loading/unloading device is disclosed in the German Patent Application No. 2,544,818 filed Oct. 3, 1975 by A. Jacknau. This disclosure deals with a table top model loading/unloading device in which three compartments are provided, one for storing unexposed microfiche film sheets, one for the storage of exposed microfiche film sheets and one for the microfiche cassette. The interior is accessible by hand via a light impervious, loosely hanging sleeve which is tapered and via which an operator may carry out manipulations involved in loading and unloading a cassette. The latter is removed from the device and is ready for a subsequent exposure cycle.

It will be clear that this way of handling microfiche sheets requires a considerable amount of skill and attention by the operator and that the chance of making mistakes is not excluded. It is therefore an object of the invention to provide a device for separately unloading microfiche cassettes so that the chance for intermixing unexposed and exposed microfiche film is avoided. Moreover, the invention provides for a device for automatically unloading microfiche cassettes under daylight conditions. In the following description, the term "microfiche cassette unit" should be understood as referring to units of the type just described.

According to the invention, there is provided: a device for automatically unloading a microfiche cassette unit comprising:

a housing capable of being light tightly closed and having an opening for the introduction and removal of a locked microfiche unit means within said housing for supporting the side edges of the microfiche cassette unit with its cover member facing downward means within the housing for engaging the locking-/unlocking mechanism of the microfiche cassette unit when the latter is introduced into the housing, and means to exert a downwardly directed force upon the protruding trailing edge portion of the microfiche cassette unit so that the latter is opened about its hinged end and the microfiche contained therein is released.

The microfiche thus released may be taken up by means of sucker-cups or other devices known in the art. Most conveniently, however, the housing is mounted an inclined direction so that the microfiche may fall out of the cassette under the influence of the force of gravity. Preferably, the angle of inclination amounts to at least 15 degrees.

In order to open a microfiche cassette unit of the type referred to after unlocking use may be had made of a wedge which contacts the protruding trailing edge of the unit and which is subsequently pushed in a forward direction so that the trailing edge is swung downwardly.

The unloader according to the invention is preferably designed for light-tight coupling with a processing apparatus for processing the released microfiche.

In order to provide for a reproducible feeding of the microfiche, the latter is caught between a pair of transporting rollers mounted at the entry-side of the processing apparatus and rotating at a predetermined constant speed.

The scope and spirit of the invention will become clear from the following description of a preferred embodiment and in the light of following drawings in which:

FIG. 1 shows a microfiche cassette unit of the type referred to,

Figure 1:
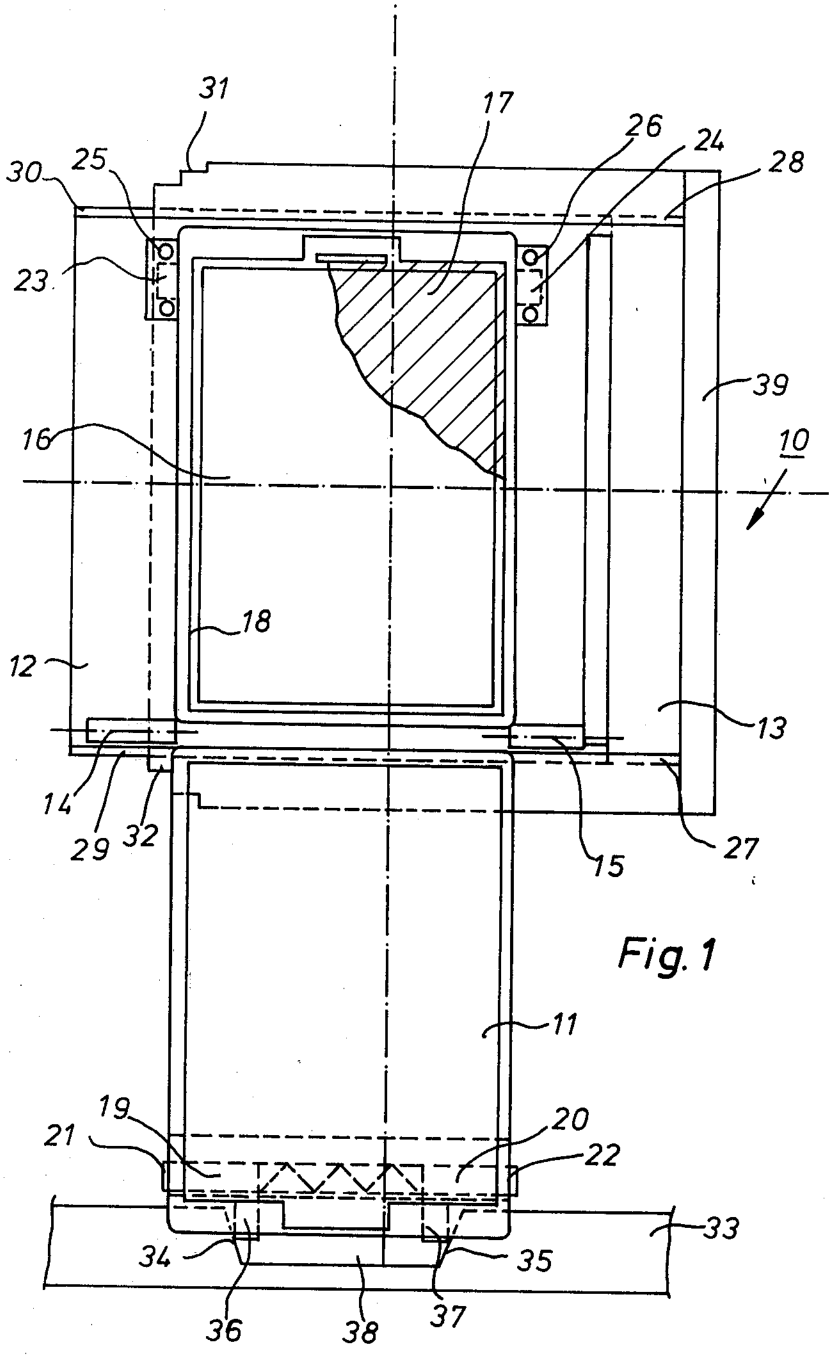

Illustrated in FIG. 1 is a microfiche cassette unit 10 used in combination with the microfiche cassette unloading device according to the invention. The microfiche cassette unit 10 as such forms no part of the invention except as better illustrating the type of unit with which the unloader according to the invention is designed to operate.

The microfiche cassette unit 10 is composed of a cover 11, a bottom 12 and a screen 13. The cover and the bottom are hingedly connected to each other by means of a pair of hinges 14 and 15. In the bottom 12 an opening 16 is provided having the approximate dimensions of a microfiche 17 (only a part of the latter being shown by an hatched area). Microfiche 17 rests with its edges in groove 18 provided in bottom 12 along the whole periphery of opening 16. When in closed condition, cover 11 is substantially coincident with the section of the bottom defined by the opening 16 and groove 18.

The cover 11 and the bottom 12 are locked together by means of spring-biased locks 19 and 20 whose protruding portions 21 respectively 22 mate with corresponding sockets 23 and 24 in the bottom 12, which sockets are provided in members 25 respectively 26, fixedly secured to the bottom 12.

In order to protect the microfiche 17 from exposure to ambient light (when the bottom structure is open) a supplementary screen 13 is provided during transport from the loading station to the exposure station (e.g. a microfiche camera not shown) and again from the exposure station to the unloading station. The screen 13 is provided on its side edges with guides 27 and 28 in which the side edges 29-30 of the bottom 12 may freely slide. An abutment member 39 is provided at the trailing edge of the screen 13 so that the set, formed by cover 11 and the bottom 12, is allowed to perform a sliding movement into and out of the screen 13. Once in the camera (not shown) the screen 13 is removed from the rest of the microfiche cassette unit 10 so that the microfiche 17 contained therein may be exposed.

For the purpose of facilitating a reproducible positioning of the microfiche cassette unit 10 in the camera (not shown) the screen 13 is also provided with profiles 31 and 32 at its leading edge which mate with and are arrested by corresponding profiles at the camera whereinafter the bottom 12 and cover 11 may be slid into the camera which becomes ready for exposure.

After exposure, the reverse action takes place, in that, after positioning the screen 13, the unit formed by the cover 11 and the bottom 12, but now containing an exposed microfiche 17, is again withdrawn from the camera, fitted within the screen 13 and transported to an unloading station in a light-tight condition. With the unloading station may be associated intermediate storage facilities or a microfiche processing apparatus.

In order to unlock a microfiche cassette unit 10, described above, use may be made of a member 33 having a recess provided with tapered positions 34 or 35 which are capable to gradually exert a force on protruding portions 36 respectively 37 of spring-biased locks 19 and 20 so that portions 21 respectively 22 are withdrawn from their mating relationship with sockets 23 respectively 24 in bottom 12.

Figure 2:
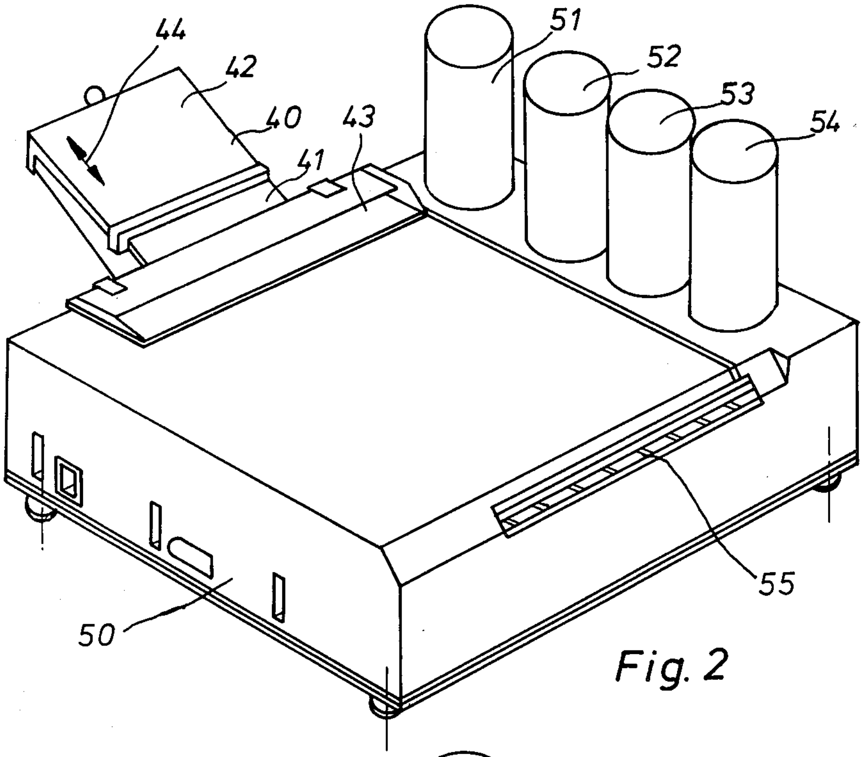
FIG. 2 shows the general set-up of the unloader coupled to a processing apparatus.

FIG. 2 shows a general set up of an unloader 40 according to the invention coupled to a microfiche processing apparatus 50. The unloader 40 comprises a housing 41 having a door 42 hingedly connected to it and via which a microfiche cassette unit 10 of the type referred to may be introduced into the housing 41. The door 42 and the housing 41 form a light-tight unit which by means of an adapter piece 43 may be coupled to the processing apparatus 50. It will be clear that the coupling of the elements referred to has also to occur in a light-tight position.

The processing apparatus 50 is of the type known in the art as a table top model. As here illustrated, it comprises four processing stations indicated by its replenishing components in the form of inverted supply bottles 51, 52, 53 and 54 each of which forms part of a so-called "chicken feed" replenishing system. The processing station corresponding with bottle 51 is a developing station, and the one corresponding with bottle 53 is a fixing station. Bottle 52 contains a stop bath for the purpose of suddenly stopping development and, finally, a rinsing station is provided for washing out the chemicals involved in the preceding steps. So bottle 54 contains water. The processing apparatus also shows an exit slot 55 via which the processed microfiche emerges after its processing.

The apparatus 50 incorporates the necessary components for controlling the processing cycle, but these have not been illustrated as they are sufficiently known in the art and form no part of the invention.

Apart from its hinging motion, the door 42 is also capable to perform small displacements according to the arrow 44 for reasons which will be further explained.

Figure 3:
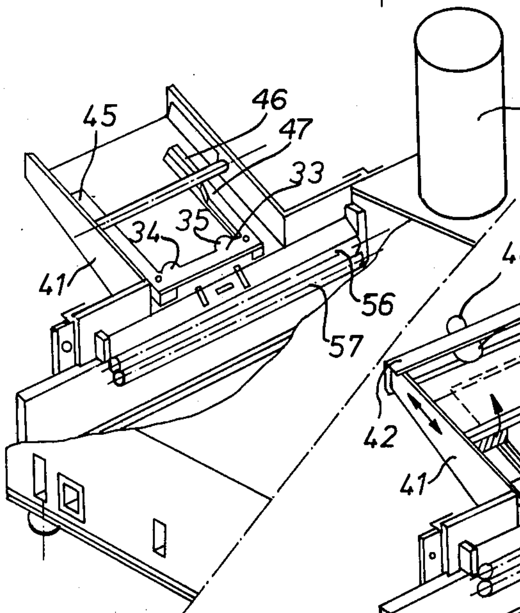
FIG. 3 shows the unloader of FIG. 2 with the cover removed.

In FIG. 3 is shown part of the same arrangement as illustrated in the preceding figure, but with the door 42 of the microfiche cassette unloader unit 40 removed.

In the housing 41 are provided two laterally extending guide members 45 and 46 upon which a microfiche cassette unit may be positioned and slid in downward direction.

In order to provide for a reproducible positioning, guide member 46 has a convergent part 47 so that a cassette (not shown) which is not in correct position when at the entry-side, becomes gradually sandwiched between guides 45 and 46 after that it has passed the convergent part 47 and consequently is aligned.

At a given moment the leading edge of the microfiche cassette unit reaches element 33 which, as already explained in relation with FIG. 1, causes the unlocking of the cover by the fact that the protruding portions 36, 37 of the spring-biased locks 19, 20 contact the tapered portions 34, 35 of member 33 which cause the disengagement of portions 21, 22 from their mating relationship with openings 23, 24 in the bottom 12 (see FIG. 1).

The downward sliding of the microfiche cassette unit is arrested by the fact that the forefront edge of the cover contacts the edge 38 in element 33 (see again FIG. 1).

Figure 4:
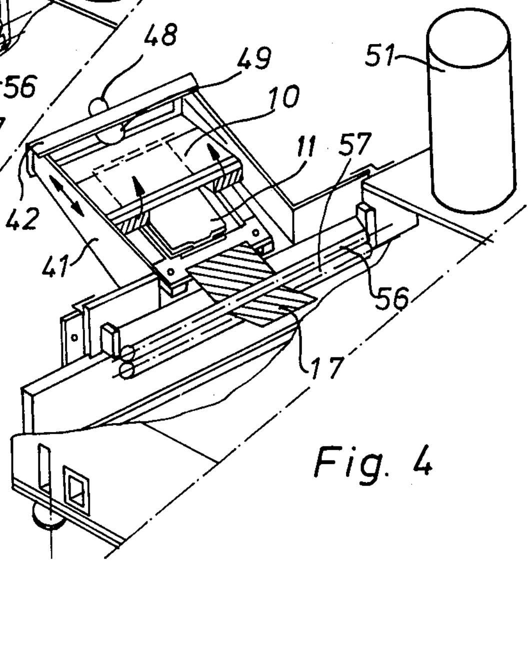
FIG. 4 shows the feeding of a microfiche into a processing apparatus.

At that moment, the door 42 of the unloader is closed. For clarity's sake, only the rear part of the door is shown. The door 42 has a knob 48 which is gripped by the operator during closing of the microfiche cassette unit unloader (FIG. 4). When knob 48 is pushed, door 42 and wedge element 49 are forced to move downwardly. This causes the rearwardly protruding edge portion of screen 13, into which fits the bottom 12 of the microfiche cassette 10 (see FIG. 1) to perform a hinging movement around the cassette hinges so that the microfiche cassette is opened in that the part of the bottom 12 and the screen 13 lying between the hinges 14 and 15 and the processing apparatus 50 are tilted in upward direction whereas the cover 11 remains in its original position assumed at the moment of introduction of the whole unit into the unloader. Due to the inclined orientation of housing 41 (at least at an angle of 15 degrees with the horizontal) the film 17 slides out of the cassette and is gripped by the input roller pair 56, 57 of the processing apparatus 50 and processed.

It will be clear that instead of a wedge 49 other devices (such as an eccentric, etc.) may be used in order to provide the downwardly directed force for opening the cassette.

For the alternative case where the microfiche cassette unit is introduced into and positioned in the unloader in a horizontal position, other means than a transport roller pair, such as a sucker-cup may be used for feeding the released microfiche into the processing apparatus.

We claim:

1. A device for automatically unloading a microfiche cassette unit of the type having a bottom into which the microfiche film is placed, a cover hingedly connected to said bottom adjacent one end of the same for opening to permit introduction and removal of the microfiche film, the hinged end of said bottom at least partially projecting outwardly from the hinge axis, and disengageable latching means at the opposite ends of said bottom and cover for latching the same together when the cover is in closed position, which device comprises:

a housing capable of being light-tightly closed and having an opening via which a locked microfiche cassette unit may be introduced with the latched end in leading relation, means within said housing for supporting the side edges of said cassette unit with said cover facing downward, means within said housing for disengaging said latching means of said microfiche cassette unit when the latter is introduced into said housing, and means operable within said housing to exert a downwardly directed force upon the outwardly projecting end portion of the cassette bottom opposite said latched end to positively pivot said bottom about said hinge axis relative to the cover and open the leading end of said cassette for release of said microfiche film.

2. An unloader according to claim 1, in which said housing is mounted in inclined position.

3. An unloader according to claim 2, in which the angle of inclination is sufficiently high to enable the microfiche to slide out of the microfiche cassette unit under the force of gravity.

4. An unloader according to claim 3, in which the angle of inclination amounts to at least 15 degrees.

5. An unloader according to claim 1, in which said means for exerting a downwardly directed force upon the projecting bottom end portion is in the form of a wedge contacting said projecting end portion and which is displaceable in the direction of the leading hinged end to cam said projecting end portion downwardly and the opposite end of said bottom upwardly with respect to said cover.

6. An unloader according to claim 1, which in addition comprises feeding means to forward the released microfiche towards a processing station.

7. An unloader according to claim 6, in which said means are in the form of a transport roller pair.

8. An unloader according to claim 6, where said housing includes a door to close said opening, said door being displaceable parallel to the cassette when supported within said housing and said wedge is carried by said door.

* * * * *